United States Patent [19]
Solomon

[11] Patent Number: 6,035,288
[45] Date of Patent: Mar. 7, 2000

[54] INTERACTIVE COMPUTER-IMPLEMENTED SYSTEM AND METHOD FOR NEGOTIATING SALE OF GOODS AND/OR SERVICES

[75] Inventor: Robert S. Solomon, Cos Cob, Conn.

[73] Assignee: Cendant Publishing, Inc., Aurora, Colo.

[21] Appl. No.: 09/106,214

[22] Filed: Jun. 29, 1998

[51] Int. Cl.$^7$ .................................................. G06F 17/60
[52] U.S. Cl. ................................. 705/37; 705/26; 705/27
[58] Field of Search ................................ 705/26, 27, 37; 273/256, 278, 237

[56] References Cited

U.S. PATENT DOCUMENTS

| | | | |
|---|---|---|---|
| 5,664,115 | 9/1997 | Fraser ........................................ | 705/37 |
| 5,717,989 | 2/1998 | Tozzoli et al. ............................ | 705/37 |
| 5,794,207 | 8/1998 | Walker et al. ............................. | 705/1 |
| 5,835,896 | 11/1998 | Fisher et al. .............................. | 705/37 |
| 5,845,265 | 12/1998 | Woolston .................................. | 705/37 |
| 5,890,138 | 3/1999 | Godin et al. ............................. | 705/26 |
| 5,905,975 | 5/1999 | Ausubel .................................... | 705/37 |
| 5,924,082 | 7/1999 | Silverman et al. ....................... | 705/37 |

OTHER PUBLICATIONS

Schmitz, Tom. "California computer auctions no boon for bargain hunters." San Jose Mercury News, Sep. 13, 1993 retrieved from DIALOG, File 609, Accession #2096205).

"Nowhere to go but up." PC Week, Oct. 23, 1995, p. A5 [retrieved from DIALOG, File 16, Accession #05870317].

"Let's hang out at the E–mall to unveil service that lets several large retail chains go online for first time." PC Week, Nov. 6, 1995 [retrieved from DIALOG, File 16, Accession #05852940].

Goff, Brent et al. "Cues to consumer susceptibility to salesperson influence: implications for adaptive retail selling." Journal of Personal Selling & Sales Management, vol. 14, No. 2, (Springe 1994) pp. 25–39.

Barua, Anitesh et al. "Efficient selection of suppliers over the Internet." Journal of Management Information Systems, vol. 13, No. 4 (Spring 1997), pp. 117–137.

*Primary Examiner*—Allen R. MacDonald
*Assistant Examiner*—Michele Stuckey Crecca
*Attorney, Agent, or Firm*—Rothwell, Figg, Ernst Kurz

[57] ABSTRACT

A computer-implemented method and system for negotiating the purchase of goods and/or services by customers utilizes a simulated human merchant having predefined behavioral attributes. An algorithm representing behavioral attributes of a simulated human merchant is used to receive customer input data relating to particular goods and/or services desired to be purchased. The customer input data is processed to generate merchant responses to the customer input data, and the sale of goods and/or services are agreed to at a particular price as a result of processing of customer replies to merchant responses according to the algorithm.

17 Claims, 3 Drawing Sheets

|  | HAPPY | ENCOURAGED | APOLOGETIC | SAD |
|---|---|---|---|---|
| HAPPY | 0 | 0 | 44.146 | 122.18 |
| ENCOURAGED | 0 | 357.456 | 318.2561 | 292.89 |
| APOLOGETIC | 1.5156 | 355.87 | 285.124 | 102.156 |
| SAD | 211.45 | 181.56 | 353.812 | 0 |

INTERACTIVE COMPUTER-IMPLEMENTED SYSTEM AND METHOD FOR NEGOTIATING SALE OF GOODS AND/OR SERVICES

BACKGROUND OF THE INVENTION

1. Field of the Invention

The present invention generally relates to interactive computer systems, such as interactive Web sites on the Internet. In particular, the invention relates to a system and method for selling goods and/or services having negotiable prices over a distributed computer network such as the Internet.

2. Description of the Background Art

Commercial sites on the Internet (in particular on the World Wide Web) are known. Typically, Web sites where merchandise or services can be purchased consist of a static description of the goods or services being offered, the price at which such goods or services are being offered, and some type of order form for a customer to enter personal and payment information.

Such sites are not well suited for the sale of goods or services that are negotiable, including unique, surplus, high-volume or discontinued items, or negotiable services. The known commercial Web sites are interactive only to the extent that a customer is able to choose a particular item for purchase and to enter payment and shipment information. Such Web sites include so-called "auction" sites such as NetMarket® (www.netmarket.com), in which users may consecutively enter prices they are willing to pay for specific products, until a set deadline, thus bidding up the price. The product is then sold to the customer with the highest bid. Such "auction" Web sites do not allow the user to negotiate with the vendor. Consequently, there is no manner by which negotiation can take place between the seller and the customer.

Thus, there exists a need in the art for a dynamic and interactive computer-implemented system which is capable of selling, through a distributed network such as the Internet, goods and/or services that have negotiable prices.

SUMMARY OF THE INVENTION

The present invention solves the existing need by providing a system for selling merchandise and/or services that a customer can purchase for a negotiable price. Hereinafter, for purposes of description of the invention the terms "goods" and "merchandise" will be understood to include goods as well as services.

The present invention provides an interactive computer-implemented system such as a site on the World Wide Web where simulated human merchants present goods for sale at negotiable prices and interact or "haggle" with customers until either an agreed price is arrived at or one party terminates the negotiation process. Each merchant has a unique "personality" which is tied to the types of goods sold by that merchant. For example, a "computer geek" merchant will deal in computer hardware and software, while a "Wall Street huckster" merchant will deal in high-ticket consumer electronics.

A customer or user of the system engages in dialog with the simulated merchant in connection with the input of a monetary offer for the desired merchandise. The user selects dialog designed to get the merchant into the best possible "mood" state in an effort to get the merchant to accept the user's offer. Each merchant will react to commentary input by a user in a manner determined by a database engine taking into account various factors such as prior user information, merchant characteristics, and historical information such as the outcome of recent "haggles" conducted by the merchant.

The system according to the present invention thus not only provides a mechanism whereby goods with negotiable prices can be sold, but also provides a source of entertainment for users who enjoy "haggling" in a bazaar-like atmosphere.

In particular, according one preferred embodiment, the present invention provides an interactive, computer-implemented system for negotiating purchases of goods and/or services, including a database storing merchant character data which simulates a human merchant having predefined behavioral attributes, an interface for enabling a customer to input data relating to the purchase of particular goods and/or services, a database engine which utilizes the merchant character data and the data inputted by a customer to generate responses to the data inputted by the customer according to the behavioral attributes, such that the occurrence of a sale for particular goods and/or services at a specific price is determined as a function of customer replies to merchant responses and the merchant behavioral attributes. According to another aspect of the invention, there is provided a computer-implemented method for negotiating the purchase of goods and/or services by customers utilizing a simulated human merchant having predefined behavioral attributes, comprising the steps of storing an algorithm representing behavioral attributes of a simulated human merchant, receiving customer input data relating to particular goods and/or services desired to be purchased, processing the customer input data according to the stored algorithm to generate merchant responses to the customer input data, and agreeing to sell said goods and/or services to a customer at a particular price as a result of processing of customer replies to merchant responses according to the algorithm.

According to yet another aspect of the invention, there is provided a computer program product having a computer readable medium having computer readable code recorded thereon for negotiating the purchase of goods and/or services by customers utilizing a simulated human merchant having predefined behavioral attributes comprising a mechanism for storing an algorithm representing behavioral attributes of a simulated human merchant, a mechanism for receiving customer input data relating to particular goods and/or services desired to be purchased, a mechanism for processing the customer input data according to the stored algorithm to generate merchant responses to the customer input data, and a mechanism for agreeing to sell said goods and/or services to a customer at a particular price as a result of processing of customer replies to merchant responses according to the algorithm.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
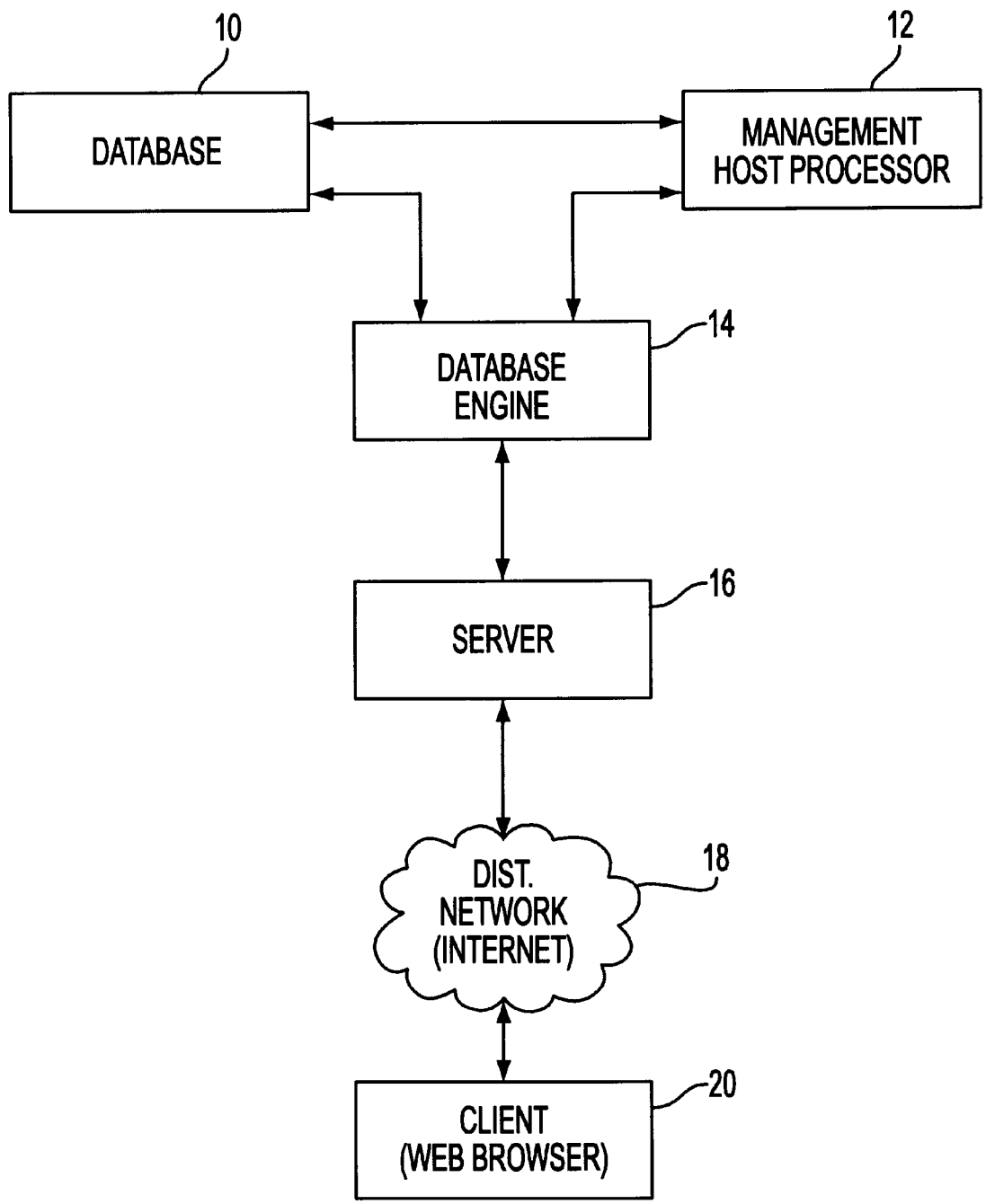
FIG. 1 is a block diagram illustrating a distributed network environment according to one preferred embodiment of the invention.
Figure 2:
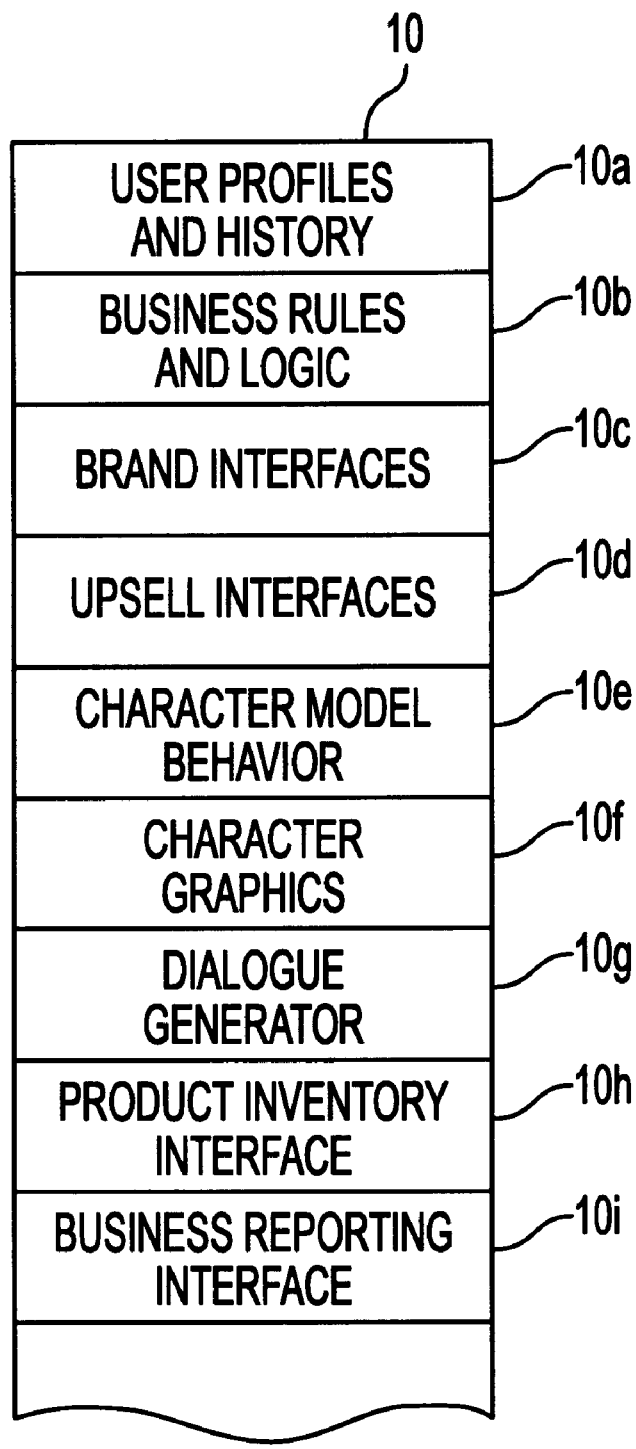
FIG. 2 is a diagram illustrating the contents of a database according to one preferred embodiment of the invention.

FIG. 1 illustrates a block diagram according to one preferred embodiment of the invention wherein the interactive system is implemented over a distributed computer network. While in the preferred embodiment the network is the Internet, the invention is equally applicable to any distributed network, whether public or private.

A database 10 contains information relating to the simulated merchants, goods being offered for sale, and user profiles. A management host processor 12 communicates with the database 10 and with a database engine 14. Management host processor 12 performs administrative and management functions in maintaining the database 10, processing merchandise orders, and feeding real-time data to negotiating sessions. For example, processor 12 may include an interface to external data sources such as news wires, stock tickers, etc. Such information may be provided to the user during a negotiating session as information of interest to the user.

The database engine 14 is in communication with a server 16 that is part of a distributed network 18, such as the Internet, and in particular the World Wide Web. Database engine 14 may be implemented as part of the server 16. A client 20 is also part of the network 18. Client 20 may be implemented by a desktop computer, laptop computer, or any other type of computer, including web browser software enabling the client 20 to communicate with and receive and process data from the server 16.

Database 10 preferably is a Relational Data Base Management System (RDBMS), as well known in the art.

Database engine 14 is preferably implemented via CGI through the server 16. The database 10 may communicate with database engine 14 and management host processor 12 through conventional Open Data Base Connectivity (ODBC) protocol, while the host processor 12 may communicate with the database engine through TCP/IP (Transmission Control Protocol/Internet Protocol) protocol.

Database 10 stores a plurality of information relating to users, merchants and merchandise, which is processed by the database engine 14 during live, interactive negotiating sessions with clients 20. Database 10 includes user profiles and history data 10a, business rules and logic data 10b, merchandise brand interface data 10c, upsell interface data 10d, merchant character model behavior data 10e, merchant character graphics data 10f, a merchant dialogue generator 10g, a product inventory interface 10h, and a business reporting interface 10i.

In a preferred embodiment, the system Web site contains hyperlink graphical portraits of the various merchants whose character information is stored in the database. A user may mouse-click on a selected portrait to link to hyperlinked text describing the items of merchandise being offered by that merchant. Clicking on the merchandise description will being the negotiating process.

The customer begins by entering personal information (credit card, address, etc.) on a data entry screen. Upon successful completion of data entry, the merchant begins the negotiating process by making an initial offer to sell to the customer the selected merchandise at a particular price. The customer then would respond with a counteroffer, accompanied by dialogue intended to get the merchant to a favorable emotional state to accept the customer's offer.

In addition to making an offer to sell, the merchant may ask the customer a yes/no question. This is intended to build a demographic profile of the customer which will be stored and used in later sessions with the same customer. The customer's response will also be used to calculate a new emotional state of the merchant which will determine the merchant's response to the customer's counteroffer.

The merchant may further make additional offers to the customer, such as "throw-in" memberships to consumer buying clubs and the like, if the customer would agree to the merchant's latest price. The identification of available "throw-ins" are stored in the "upsell" interface files 10d.

The objective of the user or customer is to interact with the merchant in a manner that would cause the merchant to agree to the customer's monetary offer for the item at issue. In this regard, each merchant has a unique character profile as stored in the character model behavior files 10e in the database 10. The merchant's mood or emotional state is conveyed to the customer through three mechanisms. First, each time a customer submits an offer, the character graphics are updated to a new facial expression indicative of the merchant's new emotional state. Second, textual dialogue matching the merchant's state is selected from the dialogue generator file 10g and displayed to the customer. Third, and perhaps more subtle, is the merchant's offer. As the merchant enters more negative emotional states, his or her offers will become less generous, and vice versa. The challenge for the customer is to interpret the merchant's mood from the various indicators and respond with a counteroffer and associated mood that are appropriate for the perceived mood of the merchant.

Figures 3, 4:
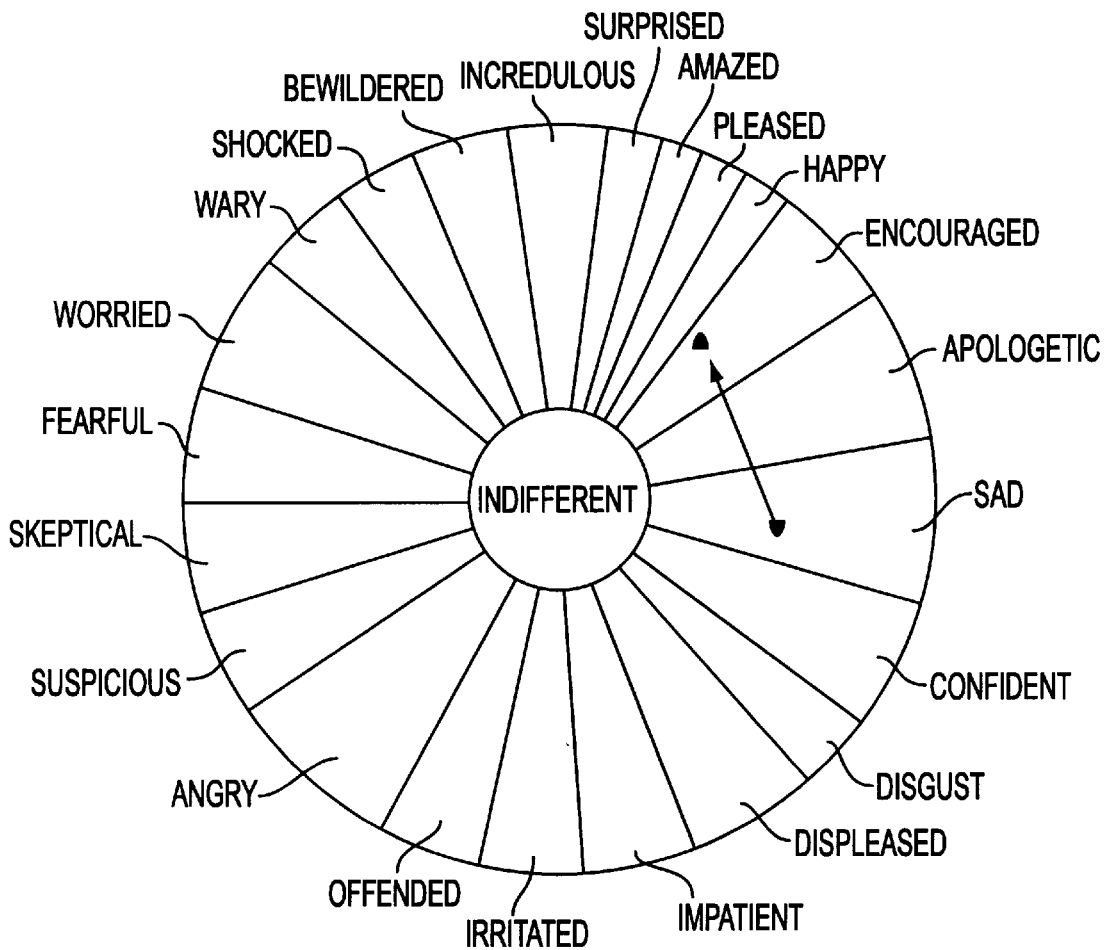
FIG. 3 is a diagram illustrating an emotion model for modeling the transitions of emotional states of simulated merchants in response to user dialog.
FIG. 4 is a chart illustrating an example of a response matrix for a particular merchant according to the invention.

The merchant's mood is calculated by the database engine 14 in response to data retrieved from the database relating to the merchant profile and the customer profile (if any). FIG. 3 illustrates an example of an emotional model used by the database engine. The model contains an arrangement of emotional states arrayed in such order that adjacent states represent natural or expected transitions from one emotion to another in response to the behavior of the customer as expressed in his or her offers and indicated mood. Further, the model is arrayed such that diametrically opposed emotional states describe emotional opposites.

FIG. 4 illustrates an example of a particular merchant's emotional response matrix. The merchant's possible states are indicated in the horizontal rows and the customer's emotional responses are indicated in the vertical columns. The values represent vectors describing the magnitude and direction that the merchant's existing emotional state will transition to. For example, a merchant whose state is "Sad" receives a bid from a customer with an "apologetic" stance. The intersection of these states yields a vector value of 353.812 from the matrix. When this vector is applied to the emotional model, it indicates a general transition towards the state of "encouraged." However, the actual emotional state reached is derived from an algorithm taking into account additional input such as the value of the customer's offer, the length of time that the merchant and customer have been engaged, the number of offers and counteroffers already made, the results of the merchant's last negotiation, the results of the customer's previous negotiating sessions, etc.

At the beginning of a negotiating session, the database engine may determine an initial emotional state of the merchant from various retrieved data, including the merchant's emotional state from immediately preceding sessions (regardless of customer); the merchant's state as it relates to the particular customer based on past history of sessions with that customer; and the customer's historical negotiating results. These factors can be weighted in any desired manner to arrive at an initial state and a weighting factor that can be used to weight any state transition experienced by the merchant according to response matrix outputs.

Each time a customer submits a new counteroffer, the database engine uses various data to compute a new merchant offer and emotional state, such as the reasonableness of the counteroffer, as determined by the divergence of the customer's counteroffer from a predetermined expected value; the response time of the customer; and the aggregate emotional state responses of the customer throughout the negotiating process. Additionally, the engine may take into account the traffic volume on the site. High traffic volume indicating high levels of customer interest could be used to cut short the present process.

The business rules and logic are structured based on gathered knowledge regarding the product at issue, the most reasonable price the product may be acquired at through other channels, and a targeted revenue distribution for each particular product. For example, 70% of the negotiations might be targeted to result in a sales price ±2% of the suggested retail price, 14% at a price 2–10% above the retail price, 10% at a price 2–6% below the normal retail price, 5% at a price 6–8% below suggested retail, and 1% at a price 8–10% below suggested retail. This target distribution may be varied according to whether a merchant was successful in getting the customer to agree to an upsell, such as purchasing a membership in a buying or entertainment club.

Ancillary features may be provided to the Web site to increase user interest and involvement. For example, hyperlinks may be provided to biographical sketches of each merchant where a user may learn important clues to the merchant's behavior. A user may hyperlink to an "eavesdropping" screen where the user may observe a negotiation being carried out by another user; An "Upcoming Merchandise" screen may preview future goods that will available for sale; "A Hall of Fame" screen may list the most successful "hagglers" at the site; a tutorial area may be provided where a customer can engage in a simulated negotiating session to familiarize herself with the process.

The invention having been described, it will be is apparent to those skilled in the art that the same may be varied in many ways without departing from the spirit and scope of the invention. Any and all such modifications are intended to be included within the scope of the following claims.

What is claimed is:

1. An interactive, computer-implemented system for negotiating purchases of goods and/or services, comprising:
   a database storing merchant character data which simulates a human merchant having predefined behavioral attributes;
   interface means for enabling a customer to input data relating to the purchase of particular goods and/or services; and
   a database engine which utilizes said merchant character data and said data inputted by a customer to generate responses to said data inputted by said customer according to said behavioral attributes;
   whereby the occurrence of a sale for said particular goods and/or services at a specific price is determined as a function of customer replies to merchant responses and said merchant behavioral attributes.

2. The system of claim 1, wherein merchant responses include graphical depictions of facial expressions indicating emotional state.

3. The system of claim 1, wherein customer input data includes indication of a customer's emotional state.

4. The system of claim 1, wherein said database stores customer profile data and historical customer result data.

5. The system of claim 1, wherein said database stores merchant character data for a plurality of different merchants, each merchant being associated with particular categories of goods and/or services.

6. The system of claim 1, wherein said database engine outputs textual dialogue indicative of the emotional state of a merchant.

7. The system of claim 1, wherein the system is implemented on a distributed network.

8. The system of claim 7, wherein said distributed network is the Internet, and said interface means comprises a Web browser.

9. A computer-implemented method for negotiating the purchase of goods and/or services by customers utilizing a simulated human merchant having predefined behavioral attributes represented by stored merchant data, comprising the steps of:
   storing an algorithm representing behavioral attributes of a simulated human merchant;
   receiving customer input data relating to particular goods and/or services desired to be purchased;
   processing said customer input data according to said stored algorithm to generate merchant responses to said customer input data; and
   agreeing to sell said goods and/or services to a customer at a particular price as a result of processing of customer replies to merchant responses according to said algorithm.

10. The method of claim 9, wherein merchant responses include graphical depictions of facial expressions indicating emotional state.

11. The method of claim 9, wherein customer input data includes indication of a customer's emotional state.

12. The method of claim 9, further comprising the step of storing customer profile data and historical customer result data.

13. The method of claim 9, further comprising the step of storing merchant character data for a plurality of different merchants, each merchant being associated with particular categories of goods and/or services.

14. The method of claim 9, further comprising the step of outputting textual dialogue indicative of the emotional state of a merchant.

15. The method of claim 9, wherein the method is implemented on a distributed network.

16. The method of claim 15, wherein said distributed network is the Internet, and said customer input data is received by a Web browser.

17. A computer program product having a computer readable medium having computer readable code recorded thereon for negotiating the purchase of goods and/or services by customers utilizing a simulated human merchant having predefined behavioral attributes comprising:

means for storing an algorithm representing behavioral attributes of a simulated human merchant;

means for receiving customer input data relating to particular goods and/or services desired to be purchased;

means for processing said customer input data according to said stored algorithm to generate merchant responses to said customer input data; and means for agreeing to sell said goods and/or services to a customer at a particular price as a result of processing of customer replies to merchant responses according to said algorithm.

* * * * *